United States Patent
Jaradi et al.

(10) Patent No.: US 9,168,890 B1
(45) Date of Patent: Oct. 27, 2015

(54) SEAT BELT RETRACTOR WITH WEDGE CLAMP AND LOAD LIMITER

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/475,885

(22) Filed: Sep. 3, 2014

(51) Int. Cl.
| | |
|---|---|
| *B60R 22/42* | (2006.01) |
| *B60R 22/36* | (2006.01) |
| *B60R 22/38* | (2006.01) |
| *B60R 22/28* | (2006.01) |

(52) U.S. Cl.
CPC ............... *B60R 22/42* (2013.01); *B60R 22/36* (2013.01); *B60R 22/38* (2013.01); *B60R 2022/286* (2013.01)

(58) Field of Classification Search
CPC ................................................ B60R 2022/286
See application file for complete search history.

(56) References Cited

U.S. PATENT DOCUMENTS

| | | | |
|---|---|---|---|
| 3,952,967 A | 4/1976 | Barile et al. | |
| 4,278,215 A * | 7/1981 | Nakaho | 242/381.4 |
| 4,310,176 A | 1/1982 | Furusawa et al. | |
| 4,772,046 A | 9/1988 | Salomonsson et al. | |
| 5,005,909 A * | 4/1991 | Fohl | 297/472 |
| 5,044,575 A * | 9/1991 | Knabel et al. | 242/381.4 |
| 5,211,694 A * | 5/1993 | Sakakida et al. | 280/806 |
| 5,242,213 A * | 9/1993 | Fohl | 297/472 |
| 5,344,096 A * | 9/1994 | Frei et al. | 242/379 |
| 5,558,294 A * | 9/1996 | Sasaki et al. | 242/377 |
| 5,580,091 A * | 12/1996 | Doty | 280/805 |
| 5,588,609 A * | 12/1996 | Ohsumi | 242/376 |
| 5,588,611 A * | 12/1996 | Osumi et al. | 242/381.1 |
| 5,613,647 A | 3/1997 | Dybro et al. | |
| 5,628,469 A | 5/1997 | Fohl | |
| 5,678,782 A * | 10/1997 | Osumi | 242/381.1 |
| 5,971,489 A * | 10/1999 | Smithson et al. | 297/472 |
| 6,196,589 B1 | 3/2001 | Smithson et al. | |
| 6,213,510 B1 * | 4/2001 | Suyama | 280/805 |
| 6,309,023 B2 | 10/2001 | Howell et al. | |
| 6,736,427 B2 * | 5/2004 | Herrmann et al. | 280/805 |
| 6,913,288 B2 * | 7/2005 | Schulz et al. | 280/805 |
| 7,128,374 B2 * | 10/2006 | Mitropoulos | 297/472 |
| 7,669,794 B2 | 3/2010 | Boelstler et al. | |
| 7,731,117 B2 * | 6/2010 | Yasuda et al. | 242/379.1 |
| 8,070,185 B2 * | 12/2011 | Jernstrvm | 280/805 |
| 2012/0067994 A1 * | 3/2012 | Yamazoe et al. | 242/374 |

OTHER PUBLICATIONS

International Herald Tribune, The Associated Press, "Fake seat belt to fool police causes death of New Zealand driver", Feb. 22, 2008, 13 pages.

* cited by examiner

*Primary Examiner* — Nicole Verley
(74) *Attorney, Agent, or Firm* — Frank MacKenzie; Bejin Bieneman PLC

(57) ABSTRACT

A seat belt system includes a spool, a harness, a wedge clamp, and a load limiting plate. The harness is at least partially wound about the spool. The wedge clamp selectively engages the harness. The load limiting plate, which has deformable teeth, is operably attached to the spool. The teeth engage a pin. The pin deforms the teeth after a vehicle impact.

19 Claims, 2 Drawing Sheets

SEAT BELT RETRACTOR WITH WEDGE CLAMP AND LOAD LIMITER

BACKGROUND

Most vehicles have a seat belt assembly that limits passenger movement during a crash. Sometimes, a pretensioner is used to preemptively lock the seat belt before the crash occurs. Even when engaged, however, pretensioners do not prevent the seat belt from moving. For example, slack can accumulate when a seat belt is wound on a spool. Simply engaging the pretensioner does not eliminate the slack. Referred to as the film spooling effect, during a collision, the slack must be taken up before forward movement of the passenger can be stopped.

DETAILED DESCRIPTION

By eliminating the film spooling effect, the seat belt can engage a passenger sooner after a vehicle collision. An example seat belt system that eliminates or significantly reduces the film spooling effect includes a spool, a harness, a wedge clamp, and a load limiting plate. The harness is at least partially wound about the spool. The wedge clamp selectively engages the harness before or immediately after a vehicle impact is detected. By engaging the wedge clamp, the force applied to the harness may act on the retractor base immediately, that is, without having to take up the slack that may have otherwise accumulated when the harness was wound about the spool. The force applied to the retractor base is therefore immediately transferred to the load limiting plate, which has deformable teeth that engage a pin. The force of the impact causes the pin to deform the teeth. The load limiting plate, therefore, absorbs some of the impact and reduces the load applied to the passenger during the impact.

The elements shown may take many different forms and include multiple and/or alternate components and facilities. The example components illustrated are not intended to be limiting. Indeed, additional or alternative components and/or implementations may be used.

Figure 1:
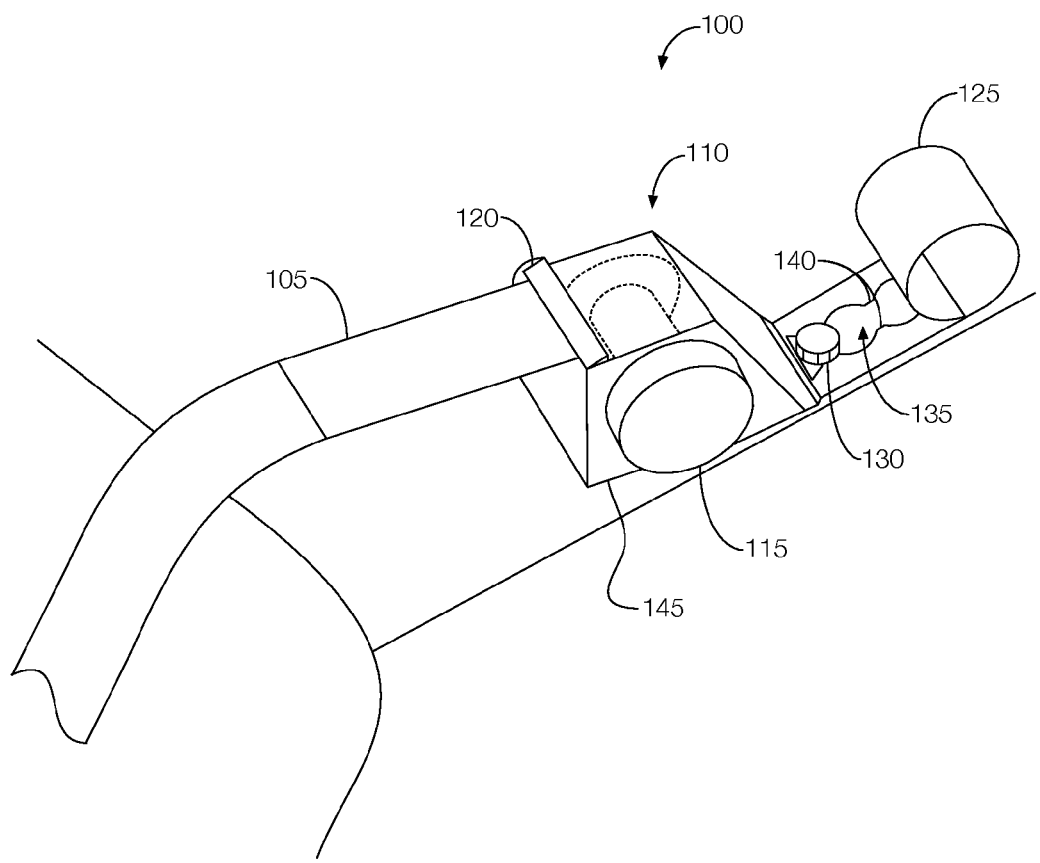
FIG. 1 illustrates an example seat belt system having a wedge clamp and a load limiting plate.

As illustrated in FIG. 1, the seat belt system 100 includes a harness 105 and a retractor 110 having a spool 115, a wedge clamp 120, and a load limiting plate 125. The harness 105, sometimes referred to as "webbing," may be formed from a material such as nylon or polyester. At least part of the harness 105 may be wound about the spool 115. When the retractor 110 is not engaged, the harness 105 may be unwound from the spool 115 by, e.g., pulling on the harness 105. When the retractor 110 is engaged, the harness 105 may be locked relative to the spool 115 to, e.g., hold a passenger in his or her seat.

The spool 115 may include a flanged cylinder configured to receive at least part of the harness 105. That is, a length of the harness 105 may be wound about the cylinder. In some instances, the spool 115 may be biased toward keeping the harness 105 wound about the cylinder. The bias may be overcome by pulling on the harness 105 with a sufficient force. The spool 115 may be disposed on a vehicle body such as a vehicle seat, pillar, or other structure.

The wedge clamp 120 may be configured to selectively engage the harness 105 to, e.g., prevent the harness 105 from advancing out of or retracting into the spool 115. When the wedge clamp 120 is disengaged, however, the harness 105 is free to advance or retract relative to the spool 115. The wedge clamp 120 may be disposed on the retractor base 145. When the wedge clamp 120 is engaged with the harness 105, any force applied to the harness 105 may be transferred from the clamp to the retractor base 145 and into the vehicle body without overcoming the bias of the spool 115. In other words, the wedge clamp 120 prevents the harness 105 from unwinding. Moreover, when the wedge clamp 120 is engaged, force on the harness 105 may be immediately applied to the retractor base 145 without having the take up any slack that may have accumulated when the harness 105 was wound about the spool 115. Thus, the wedge clamp 120 eliminates or significantly reduces any film spooling effect that may occur after a vehicle impact without a pretensioner. The operation of the wedge clamp 120 may be electrically controlled by, e.g., a sensor signal. For example, the wedge clamp 120 may be engaged prior to a vehicle impact or immediately in response to a sensor detecting the vehicle impact.

The load limiting plate 125 may be configured to absorb some of the vehicle impact. The load limiting plate 125 may be attached to both the retractor base 145 and the vehicle body. In one possible implementation, the load limiting plate 125 may include deformable teeth 140 configured to engage a pin 130 extending from the vehicle body. The teeth 140 may extend from the load limiting plate 125 into a channel 135 defined by the load limiting plate 125, and the pin 130 may be disposed within the channel 135. When the wedge clamp 120 is closed and a sufficient force is applied to the harness 105, the force transferred from the retractor base 145 to the load limiting plate 125 may cause some of teeth 140 to press against the pin 130. The force of the teeth 140 on the pin 130 may cause some of the teeth 140 to deform, which may allow the retractor base 145 and load limiting plate 125 to slide in a direction guided by the channel 135 until the next set of teeth 140 engage the pin 130. Assuming sufficient force remains, the pin 130 will deform one or more subsequent sets of teeth 140 encountered. Each time a set of teeth 140 is deformed, the spool 115 and load limiting plate 125 move along the channel 135 relative to the vehicle body.

Figure 2:
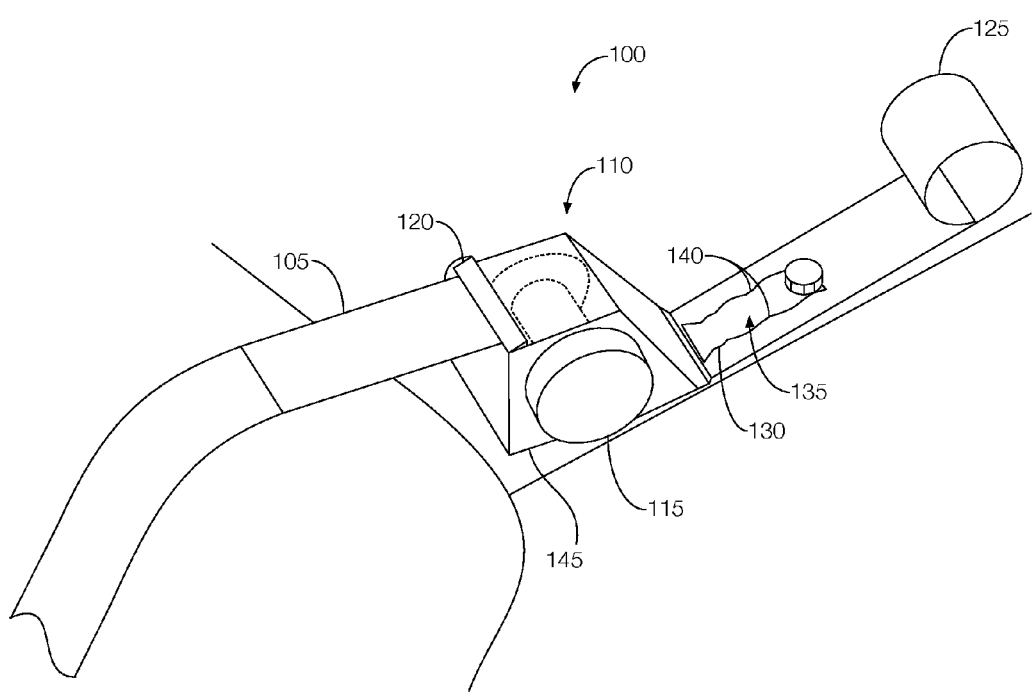
FIG. 2 illustrates the seat belt system of FIG. 1 after a vehicle impact.

FIG. 2 illustrates how the harness 105 and retractor 110 may appear after a vehicle impact. As shown, the wedge clamp 120 is engaged and the teeth 140 of the load limiting plate 125 have been deformed by the pin 130. With the teeth 140 deformed, the retractor base 145 and load limiting plate 125 were free to move along the channel 135 toward, e.g., a front of the vehicle. Engaging the wedge clamp 120 eliminated or significantly reduced the film spooling effect, which allowed the load limiting plate 125 to engage the pin 130 sooner after the vehicle impact. Otherwise, the teeth 140 of the load limiting plate 125 would not have engaged the pin 130 until all of the slack had been removed from the spool 115.

Simulated test results show that the retractor 110 having the wedge clamp 120 and load limiting plate 125 as described above may reduce occupant excursion into a forward crash area, may reduce occupant injuries in the head, neck, and torso, and may provide better occupant kinematic controls during collisions. Further, these test results can be achieved without incorporating a pretensioner into the seat belt system 100.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A seat belt system comprising:
   a spool;
   a harness at least partially wound about the spool;
   a wedge clamp configured to selectively engage the harness; and
   a load limiting plate having deformable teeth configured to engage a pin, wherein the pin is configured to deform the teeth when the wedge clamp engages the harness and a force is applied to the harness.

2. The seat belt system of claim 1, wherein the teeth are deformed by the pin after the vehicle impact.

3. The seat belt system of claim 1, further comprising a retractor base and wherein the wedge clamp is disposed on the retractor base.

4. The seat belt system of claim 1, wherein the wedge clamp is configured to engage the harness to limit a film spooling effect caused by the vehicle impact.

5. The seat belt system of claim 1, wherein the wedge clamp is configured to engage the harness prior to the vehicle impact.

6. The seat belt system of claim 1, wherein the wedge clamp engages the harness to reduce movement of the harness relative to the spool.

7. The seat belt system of claim 1, wherein the spool is disposed on a vehicle body.

8. The seat belt system of claim 1, wherein the harness is configured to advance into or retract from the spool when the wedge clamp is disengaged.

9. The seat belt system of claim 1, wherein the wedge clamp is configured to reduce movement of the harness relative to the spool independent of a pretensioner.

10. The seat belt system of claim 1, wherein the teeth of the load limiting plate are configured to deform after the wedge clamp engages the harness.

11. A seat belt retractor comprising:
    a spool configured to receive a harness;
    a wedge clamp configured to selectively engage the harness; and
    a load limiting plate having deformable teeth configured to engage a pin, wherein the pin is configured to deform the teeth and after the wedge clamp engages the harness and a force is applied to the harness.

12. The seat belt retractor of claim 11, wherein the teeth are deformed by the pin.

13. The seat belt retractor of claim 11, further comprising a retractor base and wherein the wedge clamp is disposed on the retractor base.

14. The seat belt retractor of claim 11, wherein the wedge clamp is configured to engage the harness to limit a film spooling effect.

15. The seat belt retractor of claim 11, wherein the wedge clamp is configured to engage the harness prior to the vehicle impact.

16. The seat belt retractor of claim 11, wherein the wedge clamp engages the harness to reduce movement of the harness relative to the spool.

17. The seat belt retractor of claim 11, wherein the spool is disposed on a vehicle body.

18. The seat belt retractor of claim 11, wherein engaging the wedge clamp prevents the harness from advancing into or retracting from the spool.

19. The seat belt retractor of claim 11, wherein the wedge clamp is configured to reduce movement of the harness relative to the spool independent of a pretensioner.

* * * * *